United States Patent [19]

Hock et al.

[11] Patent Number: 4,968,994

[45] Date of Patent: Nov. 6, 1990

[54] HEAD TENDING APPARATUS FOR AN INK JET PRINTER

[75] Inventors: Allan G. Hock; Kathryn McMahon, both of Londonderry; John G. Sousa, Nashua, all of N.H.; Calvin M. Winey, Tewksbury, Mass.

[73] Assignee: Howtek, Inc., Hudson, N.H.

[21] Appl. No.: 370,379

[22] Filed: May 30, 1989

Related U.S. Application Data

[63] Continuation of Ser. No. 112,900, Oct. 23, 1987, abandoned.

[51] Int. Cl.[5] .......................... G01D 15/16; B41J 3/04

[52] U.S. Cl. .................................. 346/1.1; 346/140 R

[58] Field of Search .................................. 346/1.1, 140

[56] References Cited

U.S. PATENT DOCUMENTS

| | | | |
|---|---|---|---|
| 4,050,078 | 9/1977 | Isayama | 346/140 |
| 4,296,418 | 10/1981 | Yamazaki | 346/140 X |
| 4,306,245 | 12/1981 | Kasugayama | 346/140 |
| 4,340,897 | 7/1982 | Miller | 346/140 |
| 4,479,136 | 12/1984 | Lewis | 346/140 |
| 4,540,997 | 9/1985 | Biggs | 346/140 |
| 4,546,363 | 10/1985 | Iwagami | 346/140 |
| 4,609,925 | 9/1986 | Nozo | 346/140 X |
| 4,714,936 | 12/1987 | Helinski | 346/140 |

OTHER PUBLICATIONS

Maintenance System and Sequence for Impulse Ink Jet Printer, IBM Tech. Disc. Bulletin, vol. 28, No. 6, Nov. 1985, pp. 2344–2345.

*Primary Examiner*—Joseph W. Hartary
*Attorney, Agent, or Firm*—Nutter, McClennen & Fish

[57] ABSTRACT

A head tending apparatus for an ink jet printing system with at least one ink jet is disclosed. The apparatus includes a solvent supply system for spraying solvent on the faces of the ink jets and in the jet openings. The apparatus also has a brush for scrubbing the ink jet faces during and immediately after the spraying process. The solvent loosens and dissolves any solid matter that may have formed on the jet faces or in the jet openings and also deprimes any ink remaining in the jets when the printer is shut down; the brush cleans the loosened matter off the jet faces. If the printer has a rotating image insert assembly with the ink jets thereon, the brush and a solvent jet are mounted to a shell adjacent the ink jets. The brush includes a bristle-free section that is normally adjacent the image insert assembly and spaced away therefrom when the head tending apparatus is deactivated; this prevents the apparatus from interfering with the normal operation of the printer.

16 Claims, 4 Drawing Sheets

HEAD TENDING APPARATUS FOR AN INK JET PRINTER

RELATED APPLICATIONS

This application is a continuation of Ser. No. 112,900, filed Oct. 23, 1987, now abandoned.

FIELD OF THE INVENTION

This invention relates to ink jet printing systems, and in particular to an apparatus for cleaning the jets on the printer and preparing them for priming.

BACKGROUND OF THE INVENTION

Ink jet printers are becoming an increasing popular type of device for recording permanent images on paper. Ink jet printers operate by directing a stream of minute ink droplets at the paper so as to produce a distinct pattern of individual ink dots. By selectively forming ink dots on paper, and by regulating the number of dots formed on the paper, an ink jet printer can be used to create almost any type of print: text; graphics; or images. This capability has made it attractive to attach ink jet printers to computer systems that produce both textual material and images simultaneously. This is because a properly programmed ink jet printer can be used to produce a complicated image and a detailed description of the image on the same page.

Moreover, many ink jet printers are capable of discharging multiple colors of ink so as to generate quality color figures and images. This capability has contributed to their popularity since computer systems that can generate multi-color video output in the form of graphics and images are becoming increasingly common. These computer systems require printing devices that can produce permanent images of the output they generate. The ability of ink jet printers' to produce text and images in color has also made them useful for desk top publishing which allows a small user to efficiently, economically and rapidly produce publications that contain textual material that is accompanied by color images.

Like many other liquid discharging systems, ink jet printers must be "primed" before they can operate. Typically, this is accomplished by applying pressure to a reservoir where the ink is stored prior to its discharge through the jets. The pressure forces ink through the jets up to the jet openings so as to fill the jets with ink to insure proper performance, including the consistent discharge of ink droplets of substantially identical size whenever the ink jets are activated.

The proper operation of the jets, even after priming, is often adversely affected by residual matter that is frequently found inside the jet passageways. This residual matter includes deposits of dried ink that remain in the jets, such as at the end of the day after the printer is turned off. In addition to possibly blocking the orifice of the jets, these deposits can cause bubble-forming turbulence to develop during the priming process. The bubbles attach themselves to the walls of the jet passageways, and are often not discharged therefrom by subsequent purging (i.e., clearing the ink passageways of air or debris by forced flow of ink) or repriming. As a result the jet passageways will not be completely full of ink, and consequently ink may not jet from the jets, or it may be jetted at varying velocities therefrom, or ink droplets of substantially different sizes may be discharged.

A variety of inks are used in ink jet printers, including inks that are normally liquid at room temperatures and above (hereinafter referred to simply as "liquid" inks) and those that are normally solid at room temperatures but that are heated to elevated temperatures to liquefy them for jetting (the so-called "hot-melt" or "phase-change" inks). Hot-melt inking systems are used, in part, because the ink they discharge solidifies rapidly on contact with the paper and the forms ink dots with very sharp optical edges so the resulting images are of very high quality. Hot melt inks also have exceptional true color mixing properties which is an important characteristic for color printers that typically have three base color inks, plus black, that are blended together to print a very large spectrum of intermediate colors.

Hot-melt ink jet printers face similar priming and purging requirements as do printers that use conventional liquid inks. In addition, the solidification of the ink, that accompanies shut-down, or deactivation, of the printer at the end of the day generates air bubbles from contraction or solidification and subsequent remelting on startup. This can fill the jet passageways with a froth head of ink heavily embedded with air bubbles.

A froth head is very difficult to remove from the jet passageway. Attempts to clear a froth head from an jet passageway are frequently unsuccessful because the froth head comprises bubbles which attach themselves to the walls of the jet passageways and are difficult to remove therefrom. The reason the bubbles cannot be discharged by priming is that a jet opening acts as a restricter to prevent adequate removal of bubbles from the larger diameter jet passageway. Attempts to discharge the froth heads from passageways by forcing a stronger purging flow of ink through them are similarly unsuccessful for the same reason. Moreover, when a strong purging flow is performed, relatively large amounts of ink are discharged from the jet; this reduces the supply of available ink, and the large volume of ink discharged unnecessarily wets the jet faces with ink.

Solid ink deposits that form inside the jet passageways may also cause bubble-forming turbulence to develop when the jets are primed. These deposits can form because ink becomes trapped in small indentations in the passageways that are invariably formed when the jets are manufactured. The ink that dries in these indentations forms solid deposits. This problem is especially a problem with printers having hot melt inking systems or other printers having a heated ink delivery system. The ink in these printers is heated, and thus can be "cooked" into the indentations as the volatile components of the ink are evaporated off. The turbulence induced by these solid deposits of ink in the jet passageways causes bubbles to form during the priming process and remain thereafter, leaving jets with less than full heads of ink.

The effectiveness of priming may also be reduced if the interior walls of the jets are dry. This is because the dry walls slow the priming flow near the walls in comparison to the flow in the center of the jets and causes erratic meniscus behavior at the head of the priming flow. As a result turbulence, and subsequent bubbles, develop adjacent the jet walls during priming, and the bubbles remain afterwards, thus reducing the effect of the priming operation.

Moreover, most ink jet printers commonly have problems caused by dirt accumulation. The dirt is from paper dust, small ink droplets that are redeposited on the faces of the jets, and other bits of matter that adhere to the heads of the ink jets adjacent their openings.

These bits of matter develop into large agglomerations that project over the jet openings. Sometimes, if the agglomerations are unusually large, they may even extend into the jet openings. These agglomerations of dirt cause a problem because they deflect the stream of ink droplets that are discharged from the jets. In some instances the agglomerations on the face of a jet may be so large that the discharge of ink therefrom is completely inhibited. As a result, the ink is inaccurately deposited on the paper and the quality of the resulting image produced is degraded. Furthermore, if the agglomerations of dirt become too large, some of the dirt may rub onto the paper and smear it.

Current apparatuses designed to minimize the problems associated with ink drying and bubbles forming within the jets of ink jet printers typically include a capping mechanism that operates in conjunction with a purging system. Examples of these systems are disclosed in U.S. Pat. Nos. 4,144,537 and 4,177,471. These patents disclose the use of capping apparatus that include some sort of cap that is urged against the ink jet opening, or which the ink jet openings are urged against. The capping apparatus is used to keep the jets covered while the printer is not in use. A purging mechanism is also provided to flush and fill the jets prior to activating the printers. A limitation of these devices is that all they do is provide a capping mechanism that is supposed to maintain the meniscus inside each of the ink jets. If the seal the cap forms around the jet breaks, the ink meniscus may slowly break, leaving the walls of the ink jets with a coating of ink that will inhibit the purging process. These devices also do nothing to alleviate the problems caused by ink deposits forming on the jet walls, or to otherwise prepare the ink jets for priming. Furthermore, only one of these apparatuses, the one disclosed in U.S. Pat. No. 4,144,537, includes a means to clean the heads of the ink jets; and the cleaning means disclosed is only an indirect system where the surface used to cap the jets is cleaned after the process. This cleaning mechanism does not insure that entire surfaces of the ink jet faces are substantially cleaned.

SUMMARY OF THE INVENTION

In contrast to prior systems that attempt to clear air and debris from the ink path simply by forcing a sufficiently large quantity of ink through the jet to clear most obstructions, we have found that the ink path is reliably maintained and renewed by forcing a depriming of the ink path by application of a solvent to the jet. The solvent breaks the meniscus forward at the tip of the jet and thereby allows the ink to flow back to the reservoir under the influence of gravity. It also enters the jet and dissolves dried ink or other debris that may have accumulated at the top of the jet. The ink path is thereafter refilled (i.e., the system is reprimed) when printing is to resume.

In accordance with the preferred embodiment of the invention as described herein with respect to a hot-melt ink jet printer, the deprime is performed when the printer is shut down, e.g., deactivated at the end of the day. Further, we have found that re-priming is facilitated by also applying the solvent to the jets just prior to repriming, before ink is fed to the ink path leading to the jet. We believe that this arises from the action of the solvent in wetting the walls of the interior of the jet adjacent to the orifice and thereby minimizing turbulent flow which could otherwise introduce air bubbles which might impede jet operation as described above.

The depriming and re-priming operations are implemented by means of a print head tending apparatus that includes a jet system for spraying solvent on the ink jets, and a rotating brush head that scrubs them. The apparatus is constructed so that at desired times the ink jets are first sprayed with solvent and then scrubbed by the brush.

The solvent sprayed onto the jets has a number of effects. It loosens and dissolves dirt agglomerations that form on the faces of the jets; further, it enters the interior of the jets and vaporizes. The combined action of the rapid vaporization of the solvent at a temperature well above the liquid state, and the solvent's cleansing effect deprimes the jets so they are emptied of any residual matter, and also dissolves or loosens any solid deposits of ink that may have formed in the jets. Moreover, the solvent serves as a wetting agent to coat the interior walls of the jets during subsequent re-priming. The brush scrubs the loosened agglomerations of dirt from the faces of the jets.

Thus, after operating this head tending apparatus, the jets are left with an environment where turbulence and subsequent bubbles are least likely to develop, and that is most conducive to a proper refill or priming operation. The head tending apparatus is also operated when the printer is shut down, such as at the end of the day; this deprimes the jets so they free of residual mater, such as ink, that may resolidify after the printer is shut down. Thus, when the printer is reactivated again, such as at the start of the next day, the jets will be free of material, such a froth head of remelted ink, that could inhibit the priming process and disrupt the regular discharge of ink droplets.

The solvent, in combination with the brush, also cleans the exterior surfaces or faces of the jets so they are free of ink or other dirt accumulations. This substantially eliminates the possibility that such dirt accumulations may deflect or block the discharge of ink droplets, or may smear onto the paper being printed on.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF THE INVENTION

Figure 1:
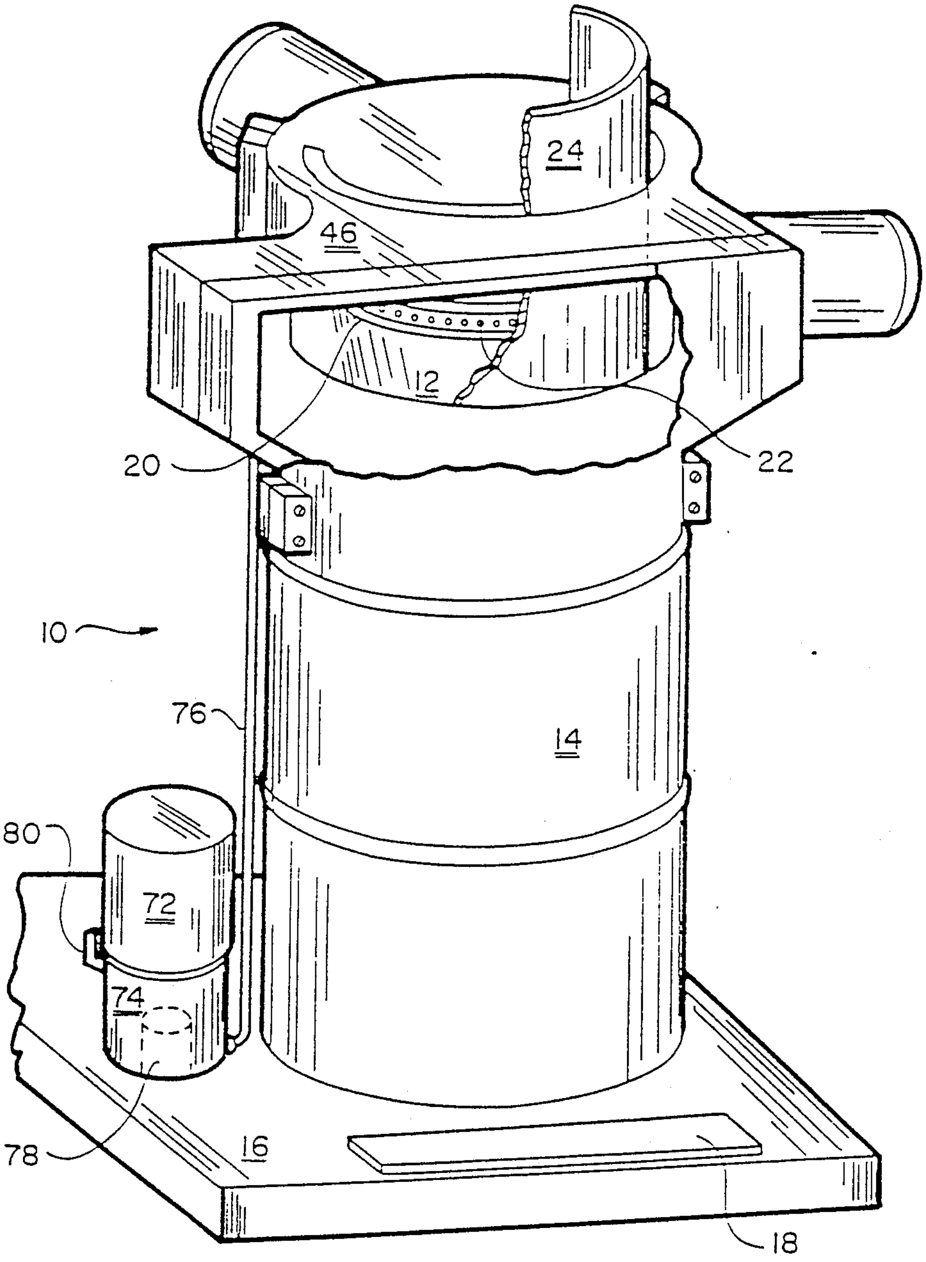
FIG. 1 is an exploded perspective view of a rotary ink jet printer incorporating the head tending system of this invention.

In FIG. 1, a rotary ink jet printing system 10 includes an image insert assembly 12 encased partially within an outer shell 14. The image insert assembly and the outer shell are mounted on a base platform 16 on which a printer control circuit 18 is also mounted. The printer control circuit 18 contains the logic circuitry necessary to operate the printing system 10. The image insert assembly 12 includes a cylindrical print head 20 that contains a number of ink jets 22. A sheet of paper 24 is fed up through the printing system between the image insert assembly 12 and the outer shell 14. The paper subtends an arc approximately two thirds around the circumference of the print head 20. When the printing system 10 is in operation, the paper 24 moves upward, the print head 20 rotates, and ink droplets from the jets 22 are selectively discharged onto the paper to form ink dots (not illustrated). The final image produced on the paper is the cumulative form of the individual ink dots that have been formed on it.

Figure 2:
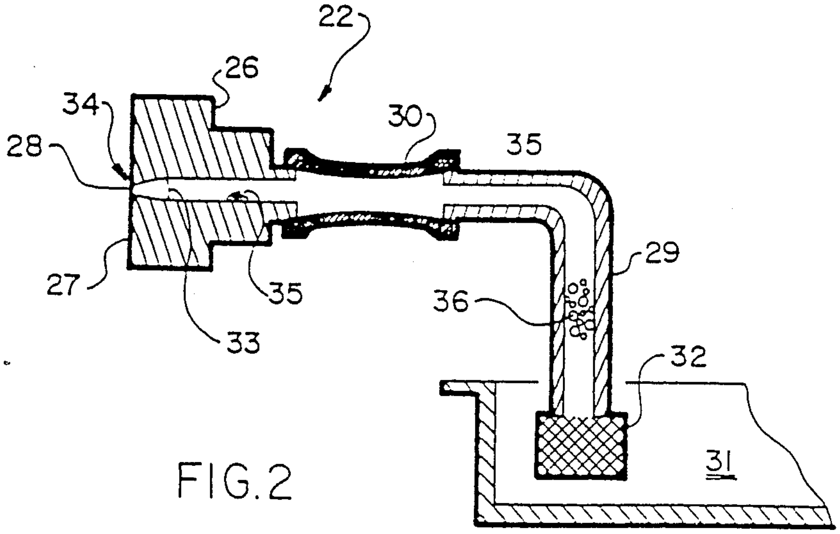
FIG. 2 is an illustrative cross-sectional view of an ink jet and ink supply path illustrating various kinds of blockage in the ink path that may lead to turbulence during priming.

FIG. 2 is a cross-sectional illustration of an individual ink jet 22. The ink jet 22 comprises a jet nozzle 26 with an exposed face 27 having a jet opening or orifice 28 through which the droplets are ejected, and a fill tube 29 through which ink is supplied. A hose 30 connects the fill tube 29 to the nozzle 26. The open end of the fill tube 29 is disposed within an ink reservoir 31 and has an attached filter element 32. The fill tube 29, hose 30, and nozzle 26 provide an ink supply path between the reservoir and the jet orifice. If the printing system includes a hot-melt ink system, the print head 20 would be provided with a set of heating elements, (not illustrated), to keep the ink within the reservoir 31 and the jets 22 in the liquid state.

The elevation of the jet 26 above the reservoir 31 provides a negative "head" to the ink at the orifice which is counterbalanced by the tension created by the meniscus 33 shown in dotted form in FIG. 2.

During the printing process, agglomerations 34 of dirt, dried ink, or the like typically form on the individual nozzle faces 27, adjacent the orifices 28. These agglomerations 34 may deflect the stream of ink droplets as they are discharged from the jets 22 onto the paper. Further, small deposits 35 of hardened ink may form along the walls of the nozzles 27, fill tubes 29, and hoses 30. If the ink jet printer is of the hot-melt type with heated jets, an air-ink froth head 36 may also form within the jets from ink within the jets that first contracts as it resolidifies when the printing system 10 is shut down and then reliquefies when the printing system 10 is reactivated and the ink is reheated. When the jets 22 are primed, turbulence may develop as the leading edge of the priming flow passes around the deposits 35. Alternatively, the bubbles within the froth head 36 may attach themselves to the internal walls of the jet and will not move, or the bubbles within the froth head may themselves may cause bubble-forming turbulence to develop. In either situation, bubbles may form, or the bubbles in the jet will not be discharged, and the operation of the jet may be impaired.

Figure 4:
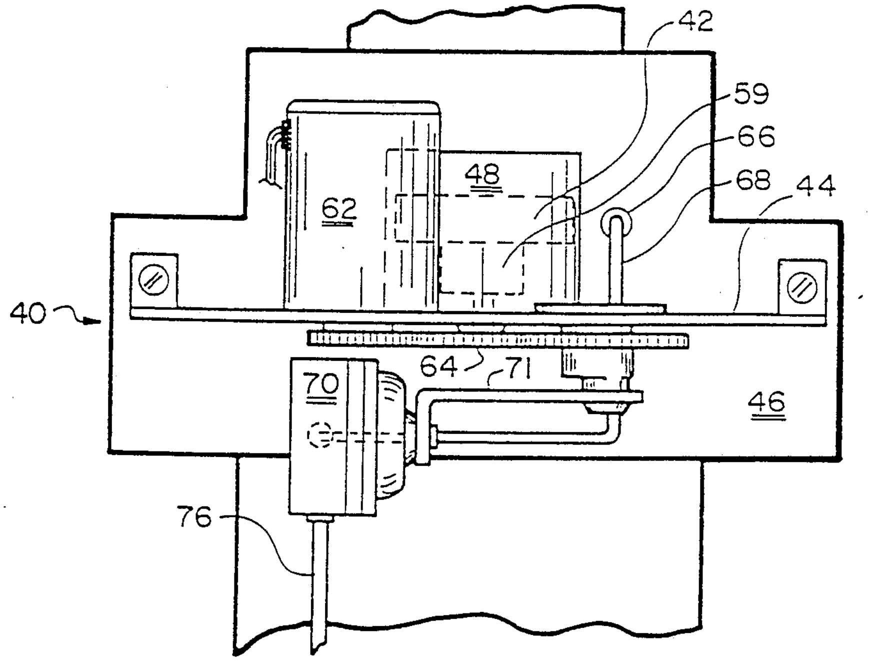
FIG. 4 is a rear view of the portion of the head tending apparatus of this invention that is attached to the image insert portion of an ink jet printer with portions broken away to show the brush assembly.
Figure 3:
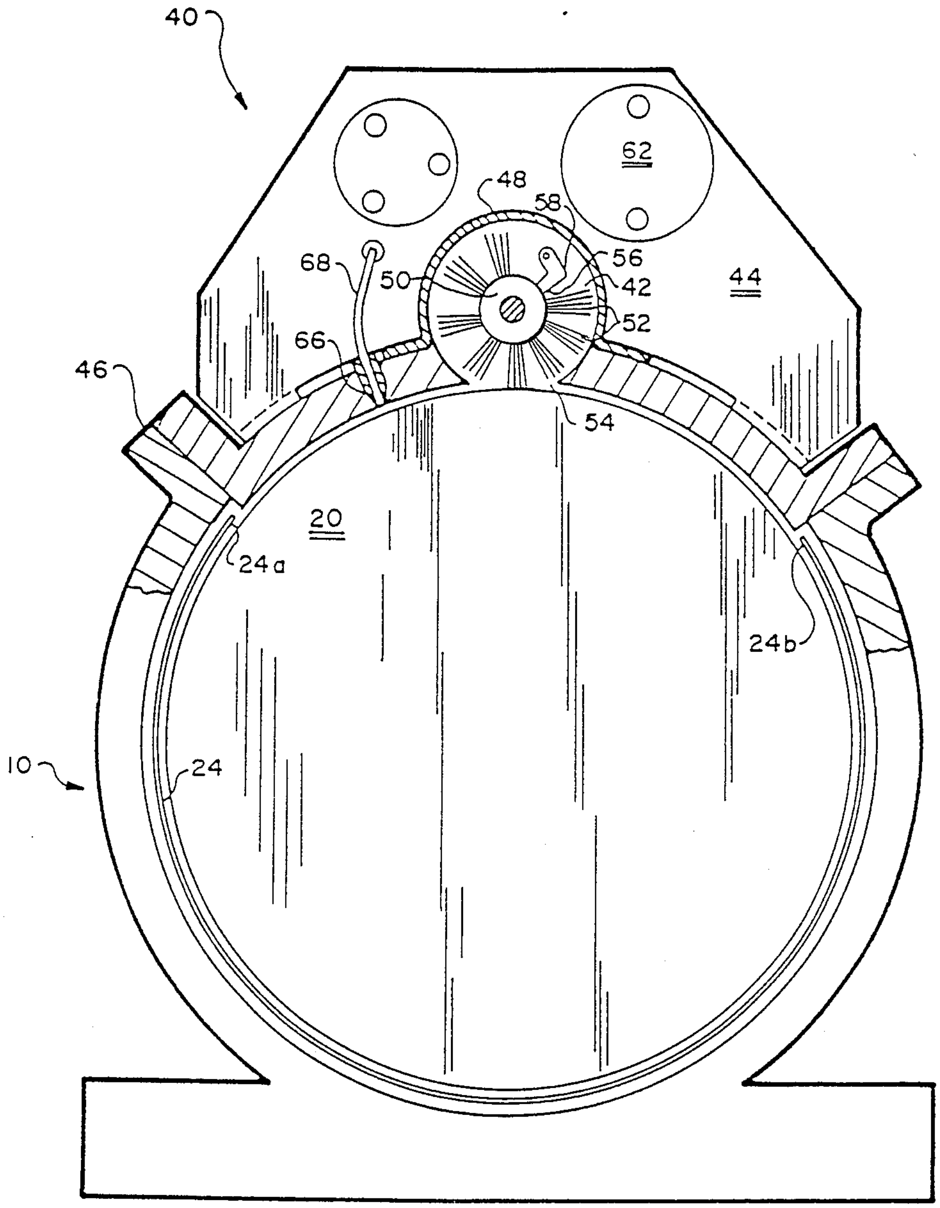
FIG. 3 is an exploded top view of the portion of the head tending apparatus of this invention that is attached to the image insert portion of an ink jet printer.

A head-tending apparatus 40 is attached to the ink jet printer 10 to clean the jets 22, as shown in FIGS. 3 and 4. The apparatus includes a rotating brush 42 attached to a frame 44 on an upper shell assembly 46 that surrounds the print head 20. The brush 42 is encased in a brush housing 48 and has a cylindrical brush head 50 with a number of tufts of bristles 52. The brush 42 is positioned so that the bristles project through a brush opening 54 in the upper shell assembly 44 and rub against a portion of the print head 20 intermediate the edges 24*a* and 24*b* of the paper and out of contact with the paper. The brush head 50 has a bristle-free section 56 that subtends an arc approximately one-third around its circumference.

Figure 3A:
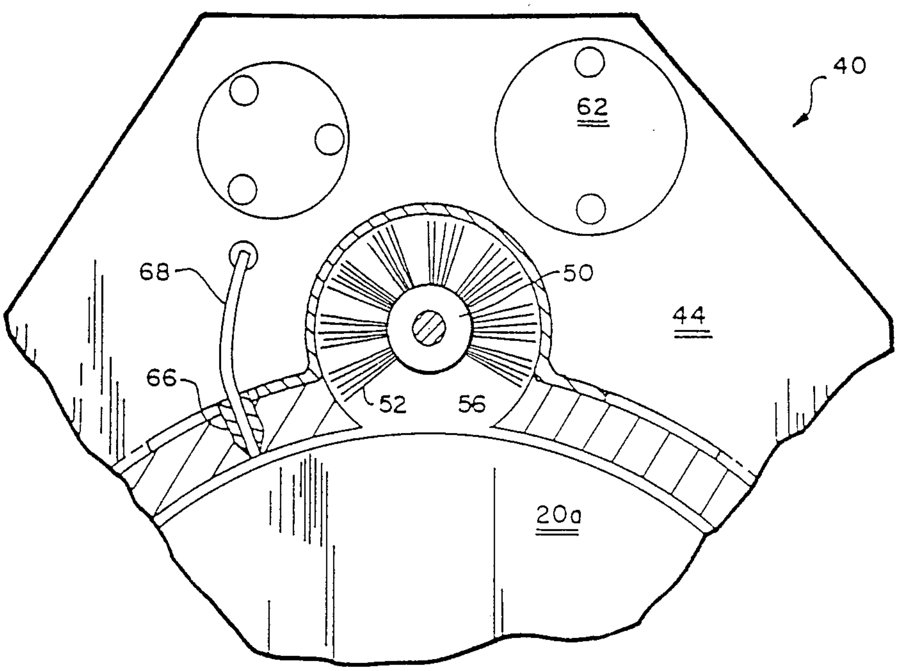
FIG. 3*a* is an exploded top view of the brush assembly of the head tending apparatus of this invention when the head tending apparatus is deactivated and the brush assembly is in the deactivated position.
Figure 5:
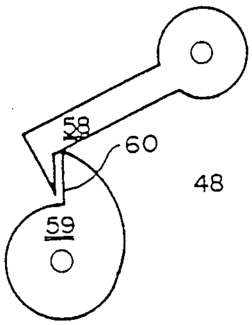
FIG. 5 is a top view of a pawl and ratchet wheel forming part of the brush assembly of the head tending apparatus of this invention.

A pivoting pawl 58 (FIG. 5) is mounted on the brush housing 48 and biased against a ratchet wheel 59 integral with the brush head 50 that is located beneath the bristles 52. The ratchet wheel 59 has a spiral perimeter and a single notch 60 so when the brush head is turned in one direction its movement will be uninhibited, and when rotated in the opposite direction the pawl 58 will engage the notch 60 so as to secure it. The pawl 58 and notch 60 are positioned to secure the brush head 50 in a deactivated position in which the bristle free-section 56 is adjacent the print head 20 (FIG. 3*a*) so that the bristles 52 are out of contact with the head.

The brush 42 is driven by a bidirectional DC motor 62 that is attached to the frame 44. The brush and motor are connected together by a gear assembly 64 coupled to the underside of the frame; the gear assembly serves as a drive train for bidirectional rotation of the brush. The actuation of the motor 62, and the direction it rotates the brush 42, is controlled by the printer control circuit 18.

A solvent jet 66 in the form of a cylindrical tube with a narrowed orifice is mounted in the outer shell assembly 46 adjacent the brush opening 54 and is directed towards the print head 20. The jet 66 is supplied with solvent through a jet supply line 68 from a solvent pump 70 mounted to the underside of the frame 44. The solvent pump is a diaphragmtype pump and is driven via the motor 62 by an eccentric 71 attached to the gear assembly 64.

The solvent pump 70 is supplied with a solvent 71, such as alcohol, from a replaceable container 72 (FIG. 1) coupled into a holder 74 on the base platform 16. The solvent is drawn from the holder to the solvent pump through a pump supply line 76. The holder has a metering device 78 so that only a specific volume of solvent is supplied to the solvent pump 70 and solvent jet 66 each time the pump is activated. A switch 80 is attached to rim of the holder 74 to detect whether a container 72 has been inserted therein. The state of the switch 80 is monitored by the printer control circuit 18.

The head tending apparatus 40 normally is activated after printing is completed as part of the process of shutting down the printer, as well as immediately prior to priming. The latter is particularly important in ensuring trouble-free re-priming. If the head tending apparatus 44 is used with a printer with a hot melt ink system, it is activated after the heating elements have already been activated, and the ink has been liquefied. The head tending apparatus 40 is controlled by the printer control circuit 18. At these times, the ink jet are at an elevated operating temperature as commonly provided for reasons of viscosity control as is known in the art. In conventional liquid ink systems, the jet temperature is commonly on the order of 125° F. In systems using hot-melt ink, the jet temperature can be on the order of 200° F.

During the first part of the head tending process, the pump 70 is activated so that solvent 71 is drawn from the container 72 and sprayed from the solvent jet 66. The image insert assembly 12 is rotated so all of the jets 22 around its periphery are sprayed at least once with the solvent 71, and preferably twice or more. In one embodiment of the invention, the metering device 78 controls the flow of solvent from the container so that approximately 1 cc of solvent is sprayed onto the jets 22 in a cycle involving from approximately three to five print head 20 passes.

While the solvent 71 is being sprayed onto the jets 22, the brush 42 is activated so that the bristles 52 "wet" scrub the faces 27 of tee jet nozzles 26. The image insert assembly 12 is set to rotate so that the jets 22 are first sprayed with solvent 71 and then immediately scrubbed by the brush. The brush scrubs the jet heads, which continue to rotate past the brush opening 54, for a selected period of time after the solvent 71 is sprayed, so that each of the jets 22 is "dry" scrubbed approximately three to five times. After the brush cycle is complete, the direction of the brush's 42 rotation is reversed until the pawl 58 and notch 60 secure the brush in the deactivated position with the bristle free-section 56 adjacent the print head 20 so that no part of the brush 42 is in contact with the print head. Simultaneously with the brush 42 resetting to its deactivated position, the image insert assembly 12 stops rotating.

This head tending apparatus 40 performs a number of functions. The solvent 71 sprayed onto the faces 27 of the jet nozzles 26 loosens the agglomerations 34 of dirt thereon, and the brush scrubs the loosened agglomerations off. This cleans the jet nozzles 26 so that dirt will not deflect or block the flow of ink droplets discharged from the jet, or possibly smear onto the paper 24 as it passes adjacent thereto.

Operation of this head tending apparatus also conditions the jets 22 for turbulence and bubble-free priming. The solvent 71 vaporize upon striking the face of the jets 22, and both liquid and vapor fractions of the solvent 71 enter the jets 22 and break the meniscus of ink at the jet opening 28. This causes ink still in the jets 22 to be flushed, or deprimed, out of the jets 22 and to flow back into the ink reservoir 31. If the printing system 10 has a hot-melt inking system, the solvent inside the jets will rapidly vaporize. The vaporized fraction of the solvent 71 dissolves or loosens any solid deposits that may have formed on the inside walls of the jets. This creates an environment inside the jets where the leading edge of the priming flow will not develop a froth head which would cause bubbles to remain after priming.

Moreover, the vaporized fraction of solvent 71 adheres to and wets the interior walls of the jets 22 for at least a limited period of time. This creates an environment adjacent the walls where turbulence and bubbles are least likely to develop.

Furthermore, in a hot-melt inking system, the solvent 71 deprimes ink from the jets 22 that would resolidify when the heating elements are deactivated. This eliminates the source of large bubbles and menisci, the resolidified ink, that forms in the jets 22 when the heating elements are reactivated, and which are difficult to remove even by priming.

Thus, operating this head tending apparatus 40 and priming the jets 22 leaves the printing system 10 with jets that have full heads of ink and are substantially bubblefree. This insures that the ink droplets that are discharged from the jets are of consistently of the same size and are discharged from the jets at substantially identical velocities so as to form ink dots on the paper of the same size. Since the faces 27 of the jet nozzles 26 are clean, the droplets will be accurately deposited onto the paper and dirt will not smear onto it. This all contributes to keeping the overall quality of the image produced on the paper high.

Another advantage of this head tending apparatus 40 is that it does not interfere with the normal operation of the printer 10. When the apparatus 40 is not in use, the brush head is in the deactivated position, and the bristles 52 are spaced away from the ink jets 22 and other portions of the image insert assembly 12. Thus, neither the brush 42, nor other portions of the head tending apparatus 40, inhibit the movement of the image insert assembly 12 during the printing process.

The foregoing description has been limited to a specific embodiment of this invention. It will be apparent, however, that variations and modifications may be made to the invention, with the attainment of some or all of the advantages of the invention. For instance, in some embodiments of the invention it may be desirable to provide the head tending apparatus with more than one solvent jet 66 directed to the ink jets 22. Moreover, in some instances it may be desirable to provide this head tending apparatus with two or more types of solvent discharged from one or more solvent jets. For example, in some circumstances it may be desirable to provide the head tending apparatus with one solvent suited to cleaning the exterior faces 27 of the jet nozzles 26, and a second solvent suited to cleaning or wetting the interior portions of the jets 22.

Nor is this invention limited to head tending apparatus used with rotating print head systems. The stationary brush and solvent jet subassembly may be used with image insert assemblies other than those with a rotating print head, or with a plurality of ink jets. Alternatively, in some embodiments of the invention, the ink jets may remain stationary and the brush and solvent jet move so that each ink jet is sprayed with solvent and scrubbed. Furthermore, in some embodiments of the invention solvents other than alcohol may be used to clean the jet faces, dissolve solid ink deposits, break any ink menisci or wet the jet walls.

Therefore, it is the object of the appended claims to cover all such variations and modifications as come within the true spirit and scope of the invention.

What is claimed as new and desired to be secured by Letters Patent of the United States is:

1. A head tending apparatus for a movable ink jet print head having at least one ink jet, each of said ink jets having a jet opening in an exposed jet face, said head tending apparatus comprising:

(A) a solvent jet means spaced from the print head for spraying a solvent on said ink jet faces and in said ink jet openings while said head is moving; and (B) a brush means with bristles, said bristles set to scrub said ink jet faces while said print head is moving.

2. The head tending apparatus of claim 1 where said solvent jet means further includes:

(A) a container for supplying said solvent;

(B) a holder for receiving said container through which said solvent is drawn;

(C) at least one solvent jet directed towards said ink jets; and (D) a solvent pump connected to said holder and said solvent jets for supplying solvent to said solvent jets.

3. The head tending apparatus of claim 1 wherein said brush means is spaced away from said ink jets when the head tending apparatus is not in use, and in contact with said ink jets when the head tending apparatus is activated.

4. The head tending apparatus of claim 1 wherein said brush means further includes a rotating brush head spaced away from ink jets with a plurality of bristles that subtend an arc substantially around said brush head for scrubbing said ink jet faces.

5. The head tending apparatus of claim 4 and further including said bristles subtending an arc less than the circumference of said brush head so as to form a bristle-free section of said brush head spaced away from said ink jets, said bristle-free section of said brush head being positioned adjacent to said ink jets when said head tending apparatus is deactivated.

6. The head tending apparatus of claim 1 wherein:

(A) said ink jets are on the outer circumference of a cylindrical print head that is part of an image insert assembly that rotates during the printing process;

(B) said brush means includes a rotating brush head mounted to a stationary shell adjacent to said print head, said brush head being spaced away from said print head, and a plurality of bristles that extend from said brush head and subtend an arc at least substantially around said brush head, at least an arcuate portion of said bristles contacting said print head; and (C) said solvent jet means including at least one solvent jet mounted in said shell section directed towards said ink jets.

7. The head tending apparatus of claim 6 and further including said shell section forming a brush opening adjacent to said brush head and said portion of bristles in contact with said print head extending through said brush opening.

8. The head tending apparatus of claim 6 wherein said bristles subtend an arc less than the circumference of said brush head so as to form a bristle-free section of said brush head spaced away from said print head, said bristle-free section of brush head being positioned adjacent to said print head when said head tending apparatus is deactivated.

9. A method of tending a ink jet print movable head having at least one ink jet, each of said ink jets having a jet opening in an exposed jet head; said method including the steps of:

(A) spraying a solvent on said ink jet heads and in said ink jet openings while the head is moving;

(B) scrubbing said ink jet heads while spraying said solvent; and (C) continuing to scrub said ink jet heads for a set period of time after spraying said solvent.

10. The method of head tending an ink jet printer in accordance with claim 9 and further including the steps of: scrubbing said ink jet heads with a brush that is spaced away from said ink jet heads when deactivated from head tending.

11. The method of head tending an ink jet printer in accordance with claim 9 wherein said ink jets are on a cylindrical print head that is part of a rotating image insert assembly, further comprising the steps of:

(A) rotating said image insert assembly;

(B) spraying said solvent from a stationary source adjacent to said print head;

(C) scrubbing said ink jet heads with a brush spaced adjacent to said print head.

12. The method of head tending an ink jet printer in accordance with claim 10 further including the step of scrubbing said ink jet heads with a rotating brush that is spaced away from said ink jet heads when deactivated from head tending.

13. A method of tending a movable ink jet print head having at least one heated jet substantially filled with hot melt ink from ink reservoir means in the head to a meniscus just inside the jet nozzle, said method comprising the steps of:

depriming each jet by vaporizing an ink solvent at the nozzle of each jet with the solvent vapor entering the jet through the nozzle and breaking the ink meniscus therein so that substantially all of the ink in that jet drains out of the jet back into the reservoir means;

continuing the vaporizing so that the solvent vapors penetrate substantially the entire length of the jet down to the reservoir means, and subsequently priming each drained jet with ink from the reservoir means to form a new ink meniscus just inside the nozzle of that jet.

14. The method defined in claim 13 and including the additional step of vaporizing ink solvent at the nozzle of each jet so that the vapors penetrate the jet after the depriming step and just prior to the priming step.

15. The method defined in claim 13 wherein the depriming step is performed while the print head is rotating.

16. The method defined in claim 13 and including the additional step of brushing the nozzle of each jet during the vaporizing step.

* * * * *